(12) United States Patent
Landreth

(10) Patent No.: US 11,681,482 B2
(45) Date of Patent: Jun. 20, 2023

(54) APPLIANCE FOR TRACKING COPIER USAGE AND CONSUMABLES

(71) Applicant: IQ Print Management, Inc., Fairfield, NJ (US)

(72) Inventor: Philip Ray Landreth, Walkersville, MD (US)

(73) Assignee: IQ Print Management, Inc., Fairfield, NJ (US)

( * ) Notice: Subject to any disclaimer, the term of this patent is extended or adjusted under 35 U.S.C. 154(b) by 0 days.

(21) Appl. No.: 17/591,509

(22) Filed: Feb. 2, 2022

(65) Prior Publication Data

US 2022/0244895 A1 Aug. 4, 2022

Related U.S. Application Data

(60) Provisional application No. 63/145,608, filed on Feb. 4, 2021.

(51) Int. Cl.
*G06F 3/12* (2006.01)

(52) U.S. Cl.
CPC .......... *G06F 3/1232* (2013.01); *G06F 3/1219* (2013.01); *G06F 3/1287* (2013.01); *G06F 3/1291* (2013.01)

(58) Field of Classification Search
CPC .... G06F 3/1232; G06F 3/1219; G06F 3/1218; G06F 3/1287; G06F 3/1291; G06F 3/1229; G06F 3/1285; H04N 1/00
See application file for complete search history.

(56) References Cited

U.S. PATENT DOCUMENTS

| 6,370,341 | B1 | 4/2002 | Haines |
| 2011/0103293 | A1* | 5/2011 | Gale ..................... H04W 88/10 370/315 |
| 2020/0074249 | A1 | 3/2020 | Nakamura et al. |
| 2021/0303235 | A1* | 9/2021 | Hirst ..................... G06F 3/1221 |

OTHER PUBLICATIONS

Officer Miroslav Kochev, Written Opinion of ISA, International Application No. PCT/US2022/015102, dated May 19, 2022.
Officer Miroslav Kochev, International Search Report, International Application No. PCT/US2022/015102, dated May 19, 2022.

* cited by examiner

*Primary Examiner* — Juan M Guillermety
(74) *Attorney, Agent, or Firm* — McGeary Cukor, LLC; Vincent E. McGeary

(57) ABSTRACT

A networked device or appliance that connects directly to a copier or printer via a network connection, such as Ethernet, or some other suitable physical network connection and protocol. The copier may, but need not, be connected to the customer environment. The appliance functions outside the user's network environment and is independent from it. The device may also be powered independently from the other aspects of the network.

20 Claims, 3 Drawing Sheets

APPLIANCE FOR TRACKING COPIER USAGE AND CONSUMABLES

REFERENCE TO RELATED APPLICATIONS

This application claims the benefit of U.S. Provisional Patent Application Ser. No. 63/145,608, filed on Feb. 4, 2021, which application is incorporated by reference.

FIELD OF THE INVENTION

The invention relates generally to network devices for facilitating copier and printing services, and more particularly to network appliances for tracking copier or printer usage and usage of copier or printer consumables.

BACKGROUND OF THE INVENTION

Copier-printer machines for commercial applications are ubiquitous, and various commercial arrangements facilitate the distribution of copier machines to businesses of all sizes. In one exemplary commercial model, a business or user contracts for usage and payment on a periodic basis, such as monthly. For example, the user's base payment includes tasking a machine for a set number of copy or print pages. The contract also sets prices for excess usage. If the minimum number of pages is exceeded in any period, the user pays some agreed amount for the overage. There are, of course, other commercial arrangements that can be made between a machine supplier and user that would benefit from automated tracking of machine outputs and usage.

In one arrangement for facilitating the efficient usage of copier and print machines and the tracking of outputs and consumables, the copier is networked on the customer's network. Software running on the customer's computer systems tracks the copy usage via the network connection to the copier. It is a disadvantage of this arrangement that the system depends on the customer's network environment to capture the copy usage. If the customer network is down or interrupted, the system may lose copy counts. While some copier-printer machines provide internal counting capability for outputs, internal copier counting capability varies with machine and typically lacks robustness and security.

Likewise, copier and printer consumables are also typically tracked in computer applications running on the customer's environment. Customer's timely orders of consumables like toner depend on the customer's use and maintenance of its software. Depending on the type of network or computer failure, data can be corrupted or notifications can be missed. A failure can result in missed orders for consumables and copier down time. An improved data collection system and method overcomes these and other disadvantages of typical networked copier and print machines.

SUMMARY OF THE INVENTION

An exemplary system according to the principles of the invention replaces or supplements existing data collection functionality with a networked device or appliance. An exemplary appliance connects directly to a copier or printer via a network connection, such as Ethernet, or some other suitable physical network connection and protocol. The copier may be connected to the customer environment. As such, the appliance can function outside the user's network environment and independent from it. The device may also be powered independently from the other aspects of the network. If the user network becomes unavailable, the appliance can continue to collect data for later uploading.

In one aspect of a system according to the invention, the appliance includes data processing capability and memory. It collects data related to copier usage and consumables, preferably in a standard data format. Preferably, the appliance collects management information base (MIB) data and object identifier data (OID). Because the appliance operates independently from the customer environment, it can continue to collect data, including usage data, even if the customer network fails.

The appliance can be equipped to connect to the customer network, to the cloud or both. In the event the customer network fails for a given time, the appliance continues to collect data. When the customer network environment resumes function, the appliance off loads its data to networked assets. The appliance can be configured to bridge the appliance to the customer network, a wide area network or the cloud, while also providing independent features and functions. In an exemplary system, the MIB and OID data are exchanged with the Simple Network Management Protocol.

In another aspect of the invention, the appliance includes a web server. An end user can access the appliance via a web browser. The appliance web server provides the end user access to the appliance for maintenance and for remote access to data.

DETAILED DESCRIPTION

Figure 1:
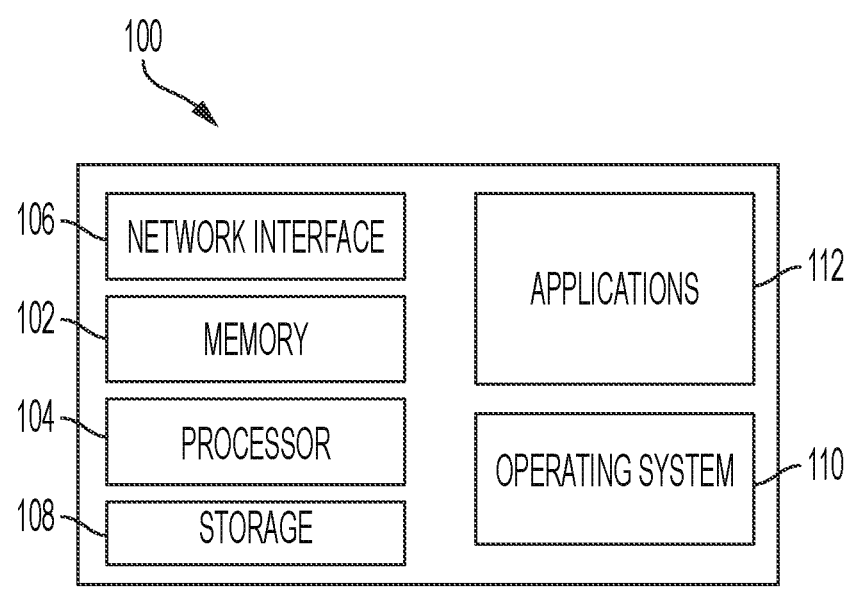
FIG. 1 shows a diagram of an exemplary appliance according to the principles of the invention.

FIG. 1 shows an exemplary appliance 100 according to the principles of the invention. The appliance comprises memory 102, a data processing device 104, one or more network interfaces 106, storage 108, an operating system 110 and executable instructions 112. In one example, the network interface 106 can include Ethernet, USB, Wi-Fi and Bluetooth. In one embodiment, the data processing device 104 comprises a Nano Pi R2S ARM Board, which will be familiar to a person of ordinary skill in the art. The Nano Pi R2S may come equipped with a Rockchip RK3328 processor, two Ethernet ports and two USB 3.0 ports. The memory includes DDR4 random access memory and read only memory. The device is optionally provided with other solid-state storage. The appliance is powered in a manner that would be apparent to a person of ordinary skill in the art, such as via USB 2.0 or greater or separate power supply. A person having ordinary skill in the art after reading this disclosure will understand how to implement the data processing device according to the principles of the invention.

Figure 2:
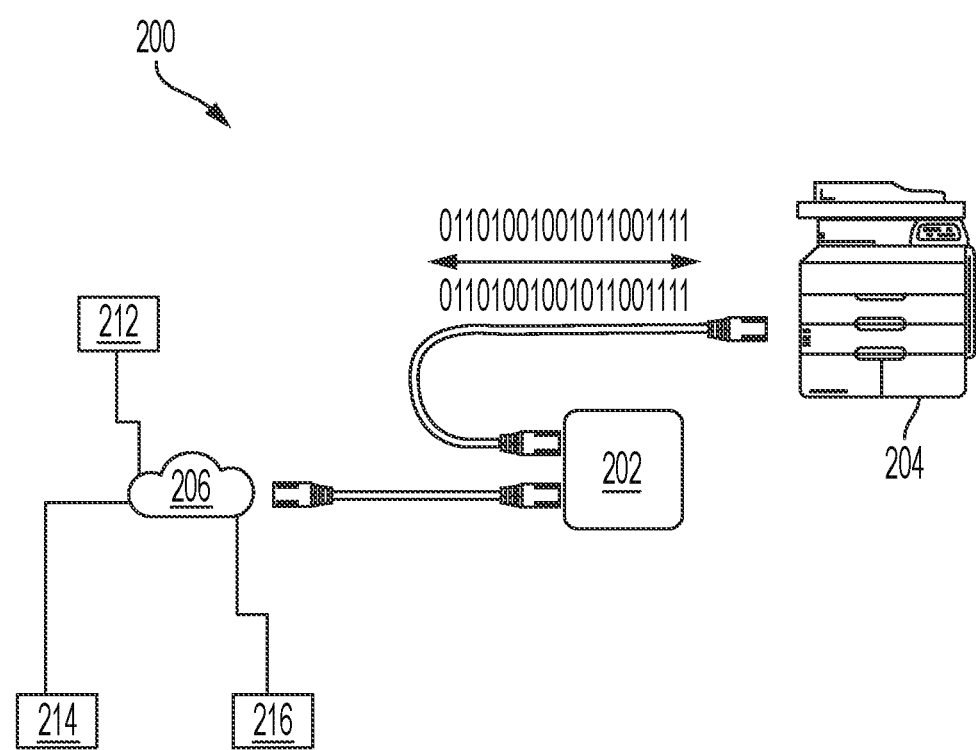
FIG. 2 shows an exemplary appliance networked to a printer and the cloud.

FIG. 2 shows an exemplary implementation 200. The appliance 202 connects to a copier-printer device 204 and to a cloud network 206. The device is preferably a copier or printer in a commercial application. The copier-printer comprises internal hardware and software for generating, processing, storing, and communicating data relevant to its usage and consumables. Such functionality includes executables for processing and storing MIB data and OID relevant to the copier or printer.

In the exemplary embodiment 200, the copier 204 connects to the appliance 202 via a network connection 210, such as Ethernet. The copier communicates with the data processing device using known protocols for transmitting and receiving MIB and OID data. The following documents provide additional information concerning the implementation of MIB databases and communication of MIB and OID data: ITU-T ASN.1; ISOC/IETF RFCs 2578; 1213, 1155 and 1157. An exemplary printer-copier that can be connected to an appliance according to the principles of the invention includes the Xerox AltaLink Series 8100. A person having ordinary skill in the art having read this disclosure will understand that any printer-copier or similar device that uses consumables and can connect to a network such as over an IPV4 connection can be implemented in networks and systems according to the principles of the invention.

As shown in FIG. 1, the appliance according to the principles of the invention includes an operating system and one or more applications. In the exemplary data processing device, the OS is a Linux ARM operating system, such as OpenWrt, FriendlyWrt or Ubuntu. The appliance connects to the copier and preferably to the Internet or other WAN or LAN via a network connection, such as Ethernet. A person of ordinary skill in the art will understand how to configure the data processing device to connect to a WAN or LAN or cloud network.

The WAN or LAN connection permits transfer of data to network managers 212, suppliers 214 or others 216 with need to manage the copier and printer systems. The WAN or LAN connection may be the user's general network environment or the Internet. In one embodiment, the appliance connects to services via the WAN or cloud. The services can access the MIB data for providing such services. An exemplary service includes managing consumables or other supplies. Another exemplary service includes generating invoices for excess copy charges. Another exemplary service includes scheduling maintenance for the copier-printer.

Figure 3:
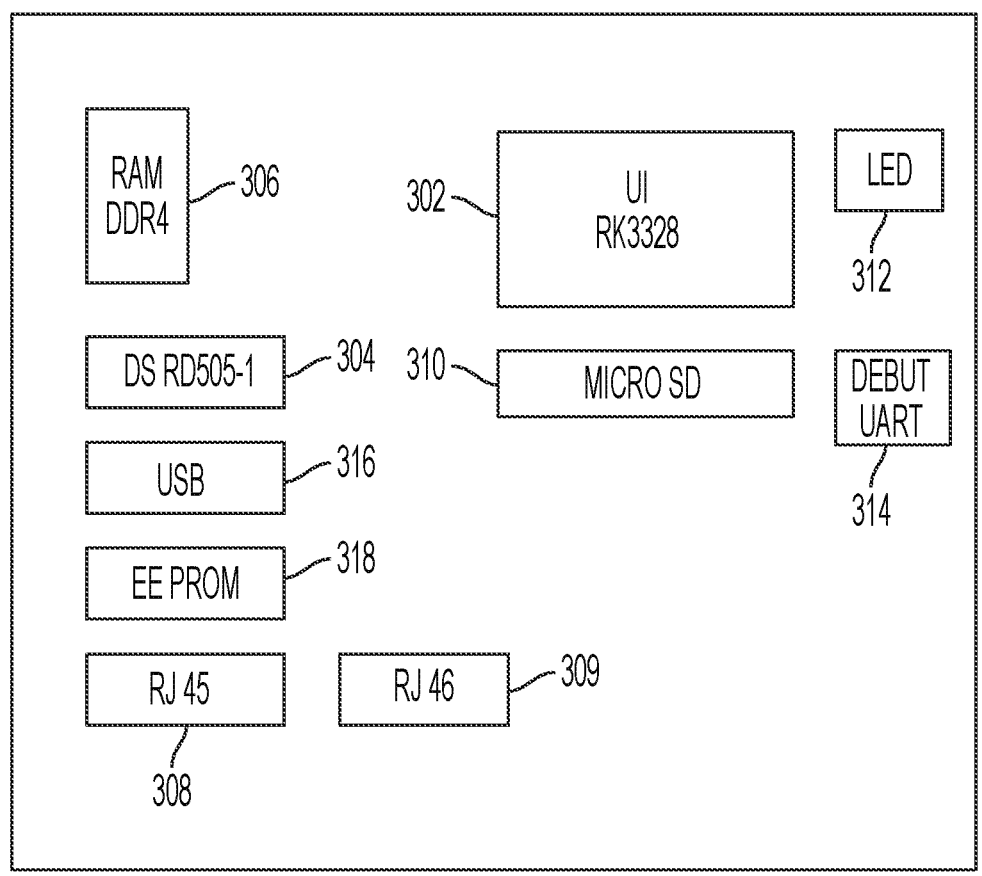
FIG. 3 shows a detailed schematic diagram of an exemplary appliance according to the principles of the invention.

FIG. 3 shows a detailed block diagram implementation of an appliance 300 according to the principles of the invention. A person of ordinary skill in the art after having read this disclosure will know how to make and use the exemplary embodiment of FIG. 3. The implementation includes an RK3328 Rockchip microcontroller 302 programmed according to the principles of the invention. The implementation also includes an on-board power supply 304, DDR4 random access memory 306, at least two RJ45 connectors for Ethernet connection 308, a micro SD card read and write module 310, status LEDs 312, at least one USB port and at least one debug UART 314. The USB port can provide power in accordance with USB 2.0 or 3.0.

In one embodiment, the device runs an application such that a user can connect to the data processing device for configuring and maintaining the data processing device via a browser or other application for addressing a networked device. A person of ordinary skill in the art after reading this disclosure will know how to configure and maintain a data processing device according to the principles of the invention.

The device can also be configured as a bridge to the copier network and receives MIB and OID data from the copier/printer to which it is connected. Software running on the device processes this data to provide the data to users connected via the device according to the principles of the invention. Software includes capability to calculate number of copies, consumable usage and other copier/printer statistics from the MIB and OID data.

The device can be configured to run on power from the copier, such as by USB 2.0 or greater, and is independent from the customer network environment. Thus, when the customer network is down or when the customer software fails, the device can continue to collect and store usage data.

The appliance can include a data collection application that causes the device to scan for a network connection to the customer environment or cloud network. Exemplary applications that can execute on the appliance, and provide scanning, data collection and other functions according to the principles of the invention include the PrintFleet and Printanista available from ECI Software Solutions, Inc. and FMAudit print monitor software available from Les Olson Company.

If power is lost to the device, the device can be configured to boot automatically when power is restored and initiate scanning and reporting. It automatically connects to an active network. It can be configured to automatically communicate the collected data since the last network connection from its on-board storage. In this manner, the risk of lost data is reduced.

It is an advantage of the device that it can provide such functionality without interrupting printing or copying services. Data passes from the copier to the device without requiring the printer or copier to divert resources away from printing. It is a further advantage that once connected, the appliance can scan for other networked printers and provide data processing for such printers. Alternatively, the user may deploy appliances on a one-to-one or one-to-few basis such that the appliance can collect data from a printer or a local printer network while the wider area network is down.

The appliance according to the invention is housed in thermally efficient case. The case includes heat-dissipating features.

The person of ordinary skill in the art after reading this disclosure will understand how to implement a system according to the invention using data processing devices and operating systems other than the exemplary systems. The person of ordinary skill in the art after reading this disclosure will understand how to implement various services and application on an appliance according to the principles of the invention.

What is claimed is:

1. A system for managing copier-printer services comprising:
    a data processing appliance operable to connect over a local network connection to a device that processes consumables and outputs printed objects and to connect to networked services residing on a wide area network, wherein the data processing appliance executes instructions that causes the data processing appliance to:
    (i) collect first data from the device indicating a usage of the consumables;
    (ii) collect second data from the device indicating outputs of printed objects;
    (iii) store collected first and second data;
    (iv) transmit the collected data to the networked services residing on the wide area network; and
    (v) continue to collect and store first data and second data when connection to the wide area network is unavailable wherein the data processing appliance transmits first data and second data, the first and second data having been stored while connection to the wide area network is unavailable, to the networked services when the connection to the wide area network is available.

2. The system of claim 1 wherein the data processing appliance further comprises a power supply operable to accept power from the device that processes consumables and provide power to the data processing appliance.

3. The system of claim 1 wherein a plurality of other devices that process consumables reside on the wide area network and the instructions further cause the data processing appliance to:
(vi) scan the wide area network for ones of the plurality of other devices that process consumables;
(vii) collect data from the ones of the plurality of other devices indicating a usage of the consumables; and
(viii) store the collected data from the ones of the plurality of other devices.

4. The system of claim 1 wherein the local network connection comprises an Ethernet connection.

5. The system of claim 4 wherein the wide area connection comprises an Ethernet connection.

6. The system of claim 1 wherein the data processing appliance executes a configuration service connectable via a web browser for configuring the data processing appliance.

7. The system of claim 1 wherein the data processing appliance executes instructions that cause the data processing appliance to bridge the device that processes consumables and outputs printed objects to the wide area network.

8. The system of claim 1 wherein the networked services residing on the wide area network include a consumable supplier.

9. The system of claim 1 wherein the device that processes consumables and outputs printed objects comprises a printer-copier.

10. A data processing appliance comprising:
a microcontroller including a processing unit, random access memory operable to store executable instructions, and data storage;
a first data network connection operable to connect the data processing appliance to a device that processes consumables;
a second data network connection operable to connect the data processing appliance to networked services residing on a wide area network;
a power supply module operable to power the data processing appliance from the device that processes consumables when the data processing appliance is connected to the device that processes consumables;
wherein the processing unit executes the executable instructions that cause the data processing appliance to:
(i) collect first data from the device indicating a usage of the consumables;
(ii) collect second data from the device indicating outputs of printed objects;
(iii) store collected first and second data in the data storage;
(iv) selectively transmit the collected data to the networked services residing on the wide area network and,
(v) continue to collect and store first data and second data when connection to the wide area network is unavailable wherein the data processing appliance transmits first data and second data, the first and second data having been stored while connection to the wide area network is unavailable, to the networked services when the connection to the wide area network is available.

11. The data processing appliance of claim 10 wherein the first data network connection comprises an Ethernet connection.

12. The data processing appliance of claim 11 wherein the second data network connection comprises an Ethernet connection.

13. A network comprising a data processing appliance according to claim 10, wherein a plurality of other devices that process consumables reside on the wide area network.

14. The network of claim 13 wherein the instructions include instructions that cause the data processing appliance to scan the wide area network for the other devices, to connect to detected other devices via the connection to the wide area network, and to collect and store data from selected ones of the other devices.

15. The network of claim 13 further comprising at least one other data processing appliance comprising a microcontroller including a processing unit, random access memory operable to store executable instructions, and data storage;
a first data network connection operable to connect the at least one other data processing appliance to one of the other devices that processes consumables;
a second data network connection operable to connect the at least one other data processing appliance to the networked services residing on the wide area network;
a power supply module operable to power the at least one other data processing appliance from the one of the other devices that processes consumables when the at least one other data processing appliance is connected to the one of the devices that processes consumables;
wherein the processing unit executes the executable instructions that cause the data processing appliance to:
(i) collect first data from the one of the other devices indicating a usage of the consumables;
(ii) collect second data from the one of the other devices indicating outputs of printed objects;
(iii) store collected first and second data in the data storage; and
(iv) selectively transmit the collected data to the networked services residing on the wide area network.

16. The network of claim 15 wherein the networked services residing on the wide area network include a consumable supplier.

17. A method of operating a data processing appliance operable to collect printer-copier usage data from a printer-copier over a first data connection and to transmit collected data over a second data connection comprising the steps of:
connecting the data processing appliance to the printer-copier via the first data connection;
powering the data processing appliance from a power output on the printer-copier;
connecting the data processing appliance to networked services residing on a wide area network via the second data connection;
collecting the printer-copier usage data from the printer-copier over the first data connection;
storing the collected printer-copier usage data on the data processing appliance; continuing the collecting and storing steps when the networked services are unavailable; and selectively transmitting the stored printer-copier usage data to the networked services, including the step of transmitting printer-copier usage data collected and stored when the networked services are unavailable.

18. The method of claim 17 including the steps of:
scanning for other printer-copiers in data communication with the data processing appliance over the wider area network; and
collecting other printer-copier usage data from selected ones of the other printer-copiers over the second data connection.

19. The method of claim 18 wherein the selectively transmitting step includes the step of transmitting other printer-copier usage data to the networked services residing on the wide area network.

20. The method of claim 17 wherein the networked services residing on the wide area network include a consumable supplier.

* * * * *